United States Patent [19]

Canova et al.

[11] Patent Number: 5,106,919

[45] Date of Patent: Apr. 21, 1992

[54] COMPATIBLE MIXTURES OF N-ARYL POLYGLUTARIMIDES WITH STYRENE COPOLYMERS

[75] Inventors: Luciano Canova, Novara; Giorgio Giannotta, Milan; Enrico Albizzati, Novara, all of Italy

[73] Assignee: Mountedipe S.r.l., Milan, Italy

[21] Appl. No.: 476,171

[22] Filed: Feb. 7, 1990

[30] Foreign Application Priority Data

Feb. 7, 1989 [IT] Italy .............................. 19340 A/89

[51] Int. Cl.$^5$ .......................... C08L 9/02; C08L 9/06; C08L 33/06; C08L 79/04
[52] U.S. Cl. ........................... 525/234; 525/66; 525/230
[58] Field of Search .................... 525/66, 230, 234

[56] References Cited

U.S. PATENT DOCUMENTS

| | | | |
|---|---|---|---|
| 4,254,232 | 3/1981 | Mueller | 525/66 |
| 4,436,871 | 3/1984 | Staas | 525/66 |

*Primary Examiner*—Jacob Ziegler
*Attorney, Agent, or Firm*—Stevens, Davis, Miller & Mosher

[57] ABSTRACT

Compatible mixtures of styrene copolymers of type SAN (AES, ABS, SAN) with polyglutarimides, characterized in that the polyglutarimides are prepared by imidization of poly(meth)acrylates and/or poly(meth)acrylic acid with amides of formula

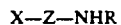

where
X = H, hydrocarbyl or, when

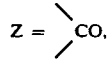

a —NHR radical or a —Y—CO—NHR radical;
R = aryl;

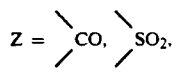

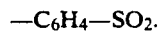

—C$_6$H$_4$—SO$_2$.

The mixtures composed of SAN copolymers and N-aryl polyglutarimides having a Tg of at least 140° C. are claimed as new mixtures.

6 Claims, No Drawings

COMPATIBLE MIXTURES OF N-ARYL POLYGLUTARIMIDES WITH STYRENE COPOLYMERS

The present invention relates to compatible mixtures of imidized acrylic polymers, or polyglutarimides, with styrene polymers of type SAN, AES and ABS.

More particularly, the present invention relates to compatible mixtures of N-aryl polyglutarimides and the styrene copolymers.

The polyglutarimides are products which are well known in the and. They are generally prepared by reacting, in various schedules acrylic polymers, such as for example polyacrylic or methacrylic acid, polyalkylacrylates or methacrylates, or copolymers of such acrylic monomers having minor amounts of copolymerizable monomers, with amines, or compounds capable of giving rise to amines in the course of the reaction, such as urea and substituted ureas, or with compounds such as amides and ammonium salts.

U.S. Pat. No. 4,246,374 describes polyglutarimides endowed with improved properties which are prepared by reaching acrylic polymers of the abovesaid type with aliphatic, cycloaliphatic or aromatic amines. The reaction is carried out in the absence of solvents, in an extruder, under specific reaction conditions.

The polyglutarimides, including the polyglutarimides disclosed in U.S. Pat. No. 4,246,374, exhibit good thermal stability, high tensile strength, high elastic modulus and good characteristics of stability to solvents. However, these polyglutarimides are brittle and exhibit a low impact strength.

It is known that the impact strength of polyglutarimides can be increased by the addition of conventional impact resistant modifiers, for example ABS copolymers.

In this connection U.S. Pat. No. 4,436,871 describes compatible or partially compatible mixtures (or otherwise indicates as soluble or partially soluble mixtures, comprising from 1 to 99 parts by weight of a polyglutarimide and from 99 to 1 parts weight of styrene-acrylonitrile copolymers.

By the terms "compatible" or "soluble", whenever used herein, are meant the systems in which only one value of Tg (the glass transition temperature), measured by DSC, is observed in the region between the Tg values of the styrene copolymer glass phase and the Tg values of the polyglutarimide. Conversely, when two Tg values are present, and the initial Tg value of one component or of both components is considerably shifted towards the Tg value of the other component, there is only a partial solubility between the two components.

As a consequence of the partial solubility, the mechanical properties of the glutarimides are only partially improved.

In the field of the mixtures of polyglutarimides with copolymers of styrene with acrylonitrile (SAN)—as is shown in particular by the type of compositions described in U.S. Pat. No. 4,436,871—it is possible to observe a general tendency toward insolubility, or incompatibility between the components as the Tg value, or imidization degree of the imidized polymer, increases.

This tendency is observed for both the non-substituted polyglutarimides and the N-alkyl-substituted polyglutarimides, no matter how prepared, as well as for all the polyglutarimides utilized in the composition of U.S. Pat. No. 4,436,871, including the N-aryl-substituted polyglutarimides prepared by reaction of the acrylic polymers with amines, according to what is disclosed in U.S. Pat. No. 4,246,374.

For example, in the case of the N-phenyl-substituted polyglutarimides prepared from acrylic polymers with aniline, a lack of compatibility with the styrene copolymers of type SAN is observed at Tg values of 135° C.

Therefore, on the basis of what was known so far from the literature about mixtures of SAN copolymers with N-aryl-substituted polyglutarimides, the ability to obtain compatible mixtures by using N-aryl-substituted polyglutarimides endowed with pregressively higher Tg appeared impossible.

It has now surprisingly been found by the Applicant that the N-aryl-substituted polyglutarimides, obtained by reacting acrylic homo or copolymers with N-aryl-substituted amides, exhibit, towards the styrene copolymers of type SAN, a remarkably different behaviour from all known polyglutarimides, in particular of the N-aryl-substituted polyglutarimides prepared in a different manner, exhibiting a full mixability or compatibility with such copolymers also at values of their Tg which correspond to the maximum imidization degree of the acrylic polymer.

The N-aryl-substituted amides utilizable for preparing the polyglutarimides suitable for achieving the objects of the invention are of the general formula:

$$X-Z-NHR \quad (I)$$

where:

R = an aryl radical

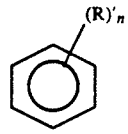

in which $R^1$ = a halogen atom, a hydroxyl, carboxylic, or alkyl group containing 1–4 carbon atoms;

n = an integer from 0 to 3, extremes included;

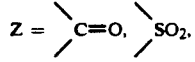

—C$_6$H$_4$—SO$_2$—;

X = hydrogen, alkyl, cycloalkyl, aryl, alkylaryl or aralkyl, containing from 1 to 20 carbon atoms, optionally containing halogen atoms as substituents; and furthermore, when

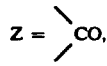

X may also be —NHR or —Y—CONHR radical;

Y = alkylene radical containing from 1 to 12 carbon atoms, either straight or branched.

Examples of such amides are: N,N'-diphenylurea, N-phenyl formamide, N-phenyl acetamide, N-phenyl propionamide, N-phenyl benzamide, N-hydroxyphenyl-benzenesulphonamide, N-chlorophenyl-formamide, N-hydroxyphenyl-acetamide, N,N'-chlorodiphenylurea, N-phenyl-nicontinamide, N-fluorophenyl-acetamide, N-phenyl oxamide, N,N'-diphenylmalonamide, N,N'-diphenyl succinamide, N,N'-diphenylphthalimide, N,N'-diphenyl malonamide, N-methylphenyl-formamide, N,N'-diethylphenylurea.

The N-aryl-substituted polyglutarimides prepared from acrylic polymers by reaction with the compounds of formula (I) indicated hereinbefore, prove to be particularly suitable for forming compatible mixtures with styrene copolymers of type SAN. SAN includes the ABS copolymers (acrylonitrile/butadiene/styrene), AES copolymers (acrylonitrile/styrene/ethylene-propylene rubbers or ethylene-propylene-diene rubbers) and SAN copolymers (styrene/acrylonitrile) with polyglutarimide/styrene copolymers weight ratios ranging from 99/1 to 1/99.

The N-aryl polyglutarimides having a Tg of at least 130° C. and preferably of at least 140° C. are particularly suited to said purpose. N-aryl polyglutarimides having Tg values of at least 160° C., and in particular of at least 170° C. are even more preferred.

Thus, the present invention relates to compositions comprising:

(a) from 1 to 99% by weight of a styrene copolymer selected from ABS, AES and SAN and
(b) from 99 to 1% by weight of a N-phenyl polyglutarimide prepared by imidization reaction or an acrylic polymer having a compound of the general formula (I).

The present invention also relates to compatible compositions containing from 1 to 99% by weight of a styrene copolymer selected from SAN, AES and ABS and from 99 to 1% by weight of a N-aryl polyglutarimide having a Tg value of at least 140° C.

The term acrylic polymers is used herein to designate the homopolymers and the copolymers of the alkyl esters of the acrylic or methacrylic acid, where the alkyl group has 1 to 8 carbon atoms, the homopolymers and the copolymers of the acrylic acid and methacrylic acid, and the copolymers of said esters with said acids.

Examples of the abovesaid esters are: methyl methacrylate, ethyl methacrylate, isopropyl methacrylate, sec.-butyl methacrylate, tert.-butyl methacrylate and the ethyl, methyl, propyl, isopropyl, butyl acrylates, etc.

Said acrylic polymers may contain units deriving from other copolymerizable mono- or poly-unsaturated monomers, such as styrene, α-methylstyrene, acrylonitrile, acrylamide, butadiene, etc.

Such polymers exhibit an inherent viscosity determined in tetrahydrofuran (THF) at 30° C. ranging from 0.05 to 7 dl/g, and preferably from 0.10 to 3 dl/g.

The N-aryl polyglutarimides to be used in the compositions according to the present invention can be prepared in accordance with known methods, by reaction between the components at 150°-350° C., in bulk or in solvent, either with or without catalysts. Proper methods of preparation are described, but only by way of example, in European patent application No. 275,918, in Italian patent applications Nos. 22504 A/87, 22505 A/87, 19531 A/88, in the name of Applicant, and in U.S. Pat. No. 2,146,209.

Component (a) of the compositions according to the present invention comprises the styrene/acrylonitrile single-stage copolymers as well as the multistage copolymers, the preparation of which comprises a styrene/acrylonitrile polymerization stage. The SAN copolymers preferably contain acryl amounts higher than 16% by weight and preferably from 20 to 50% by weight of said monomer.

The ABS copolymers preferably contain from 90 to 75% by weight of SAN; the AES compolymers preferably contain from 80 to 60% by weight of SAN.

In the SAN copolymers, the acrylonitrile can be substituted in whole or in part by methacrylonitrile.

The compositions forming the object of the present invention can be prepared by mixing the polyglutarimides with the styrene copolymer according to conventional methods. For example, it is possible to prepare a solution at 5% by weight, in total, of the two components in tetrahydrofuran and then to precipitate them with methanol, at room temperature, in the form of an intimate mixture.

It is also possible to mix said components in a Brabender and in an extruder, at the melting point of the mixtures (180°-250° C.).

The N-aryl-substituted polyglutarimides utilizable for the objects of the present invention can contain from 0.5 to 6.1% by weight of imidic nitrogen. The preferred N-phenyl-substituted polyglutarimides are the ones having a Tg value preferably equal to at least 130° C.

Such polyglutarimides are not cross-linked, are soluble in dimethylformamide and in THF and can be modified by incorporation of additives such as pigments, fillers, stabilizers, lubricants.

The following examples are given to illustrate the present invention and are not to be considered as to be a limitation thereof.

EXAMPLE 1

Preparation of a N-phenyl polyglutarimides using N,N'-diphenylurea 16.5 g of polymethyl methacrylate having an inherent viscosity in THF at 30° C. equal to 0.34 dl/g and 35 g of N,N'-diphenylurea were charged, in a nitrogen atmosphere, into a 150 ml reactor equipped with a stirrer and a discharge for the volatile components.

The mixture was gradually heated to melting and then up to 250° C., the reaction volatile products being removed by distillation.

The reaction was carried on at 240° C. for about 4 hours, then vacuum was generated in the reactor for 15 minutes by means of a mechanical pump, the temperature was brought to 150° C. and it was refluxed with nitrogen. The reaction product was dissolved in N,N-dimethylformamide, the imidized polymer being then recovered by coagulation with methanol.

The resulting product was filtered, washed with ether and dried under vacuum.

It exhibited the following characteristics:
[$\eta$] in DMF at 30° C. = 0.13 dl/g
nitrogen content = 6.1% by weight
Tg = 247° C.

The glass transition temperature (Tg) value was determined on the powdered product by means of a differential calorimeter, and it was the temperature corresponding to the flex point appearing on the thermogram when the thermal capacity of the material varies.

The temperature scanning rate was of 20° C./minute and the measurement was carried out after a first heating up to 200° C. and subsequent cooling.

EXAMPLE 2

Preparation of a N-phenyl polyglutarimides using N,N'-diphenylurea

It was operated as in example 1, using 25 g of the same polymer and 26.35 g of N,N'-diphenylurea, and reacting for 3 hours at 230° C.

The obtained polymer exhibited the following characteristics:
- [η] in THF at 30° C. = 0.35 dl/g
- imidic nitrogen content = 4.5% by weight
- Tg = 186.6° C.

EXAMPLE 3

Preparation of N-phenyl polyglutarimides using N-phenylformamide

It was operated as in example 1, using 25 g of the same polymethylmethacrylate and 15.12 g of N-phenylformamide and reacting the components for 2.5 hours at 250° C. The obtained polymer exhibited the following characterisitics:
- [η] in THF at 30° C. = 0.32 dl/g
- imidic nitrogen content = 3.24% by weight
- Tg = 170.4° C.

EXAMPLE 4

Preparation of N-phenyl polyglutarimide using N-phenylformamide

It was operated as in example 1, using 25 g of polymethylmethacrylate and 34.33 g of N-phenylformamide. The obtained product exhibited the following characteristics:
- [η] in THF a 30° C. = 0.26 dl/g
- imidic nitrogen content = 5.24% by weight
- Tg = 220° C.

EXAMPLE 5

Preparation of N-phenyl polyglutarimide using N-phenyl acetamide

It was operated as in example 1, starting from 25 g of the same polymethylmethacrylate and from 16.2 g of N-phenylacetamide and reacting the two components at 260° C. for 2 hours. The obtained polymer exhibited the following characteristics:
- [η] in THF at 30° C. = 0.30 dl/g
- imidic nitrogen content = 0.55% by weight
- Tg = 131° C.

EXAMPLE 6

Preparation of N-phenyl polyglutarimide using N-phenylacetamide

It was operated as in example 1, using 25 g of polymethyl methacrylate, 16.2 g of N-phenylacetamide and reacting at 270° C. for 5 hours. The obtained polymer exhibited the following characteristics:
- [η] in THF at 30° C. = 0.20 dl/g
- imidic nitrogen content = 2.28% by weight
- Tg = 143.5° C.

EXAMPLE 7

Preparation of N-phenyl polyglutarimide using aniline

It was operated as in example 1, using 25 g of the same polymethyl methacrylate and 23.2 g of aniline and reacting at 210° C. for 4 hours. The obtained product exhibited the following characteristics:
- [η] in THF at 30° C. = 0.37 dl/g
- imidic nitrogen content = 0.98% by weight
- Tg = 147.6° C.

EXAMPLE 8

Preparation of N-phenyl polyglutarimide using aniline

It was operated as in example 7, but using 35 g of polymethyl methacrylate and 16.6 g of aniline, and reacting for 3 hours at 220° C. The obtained polymer exhibited the following characteristics:
- [η] in THF at 30° C. = 0.36 dl/g
- imidic nitrogen content = 0.89% by weight
- Tg = 143° C.

EXAMPLE 9

Preparation of N-phenyl polyglutarimide using aniline

It was operated as in example 8, but reacting for 2 hours at 205° C. The obtained polymer exhibited the following characteristics:
- [η] in THF at 30° C. = 0.36 dl/g
- imidic nitrogen content = 0.26% by weight
- Tg = 130.5° C.

EXAMPLE 10

Using the N-phenyl polyglutarimides prepared according to examples 1 to 9, mixtures with AES copolymer in different weight ratios were prepared.

The AES copolymer consisted of:
30% by weight of amorphous rubber ethylene-/propylene/5-ethylidene-2-norbornene (Dutral TER 046/E3) having the following characteristics:

| | |
|---|---|
| propylene content = | 35% by weight |
| 5-ethylidene-2-norbornene content = | 9% by weight |
| inherent viscosity in tetrahydronaphthaline at 135° C. = | 1.9 dl/g |
| 70% by weight of SAN containing 24% by weight of acrylonitrile. | |

The Tg value of such AES copolymer is equal to 110.5° C.

The mixtures were prepared by dissolving the two components in tetrahydrofuran and by subsequent precipitation with methanol.

The Tg values, in °C., of the obtained mixes are indicated in Table I.

From the data indicated in the table it is apparent that the use of N-phenyl polyglutarimides prepared from aniline, according to examples 7, 8 and 9, gave rise to mixtures which exhibited two different Tg values, and therefore to non-homogeneous compositions due to the non-mixability of the components.

TABLE I

| | EXAMPLES | | | | | | | | |
|---|---|---|---|---|---|---|---|---|---|
| IMIDE/AES | 1 Tg °C. | 2 Tg °C. | 3 Tg °C. | 4 Tg °C. | 5 Tg °C. | 6 Tg °C. | 7 Tg °C. | 8 Tg °C. | 9 Tg °C. |
| 0/100 | 110.5 | 110.5 | 110.5 | 110.5 | 110.5 | 110.5 | 110.5 | 110.5 | 110.5 |
| 20/80 | — | 118.6 | 122.4 | — | — | — | — | — | — |

TABLE I-continued

| IMIDE/AES | EXAMPLES | | | | | | | | |
|---|---|---|---|---|---|---|---|---|---|
| | 1 Tg °C. | 2 Tg °C. | 3 Tg °C. | 4 Tg °C. | 5 Tg °C. | 6 Tg °C. | 7 Tg °C. | 8 Tg °C. | 9 Tg °C. |
| 40/60 | 153.4 | 131 | 129.6 | 148.6 | 114 | 126.1 | 112.7-151 | 103 139 | 108 134.5 |
| 60/40 | 182.1 | 153.3 | 141.6 | 171.7 | 119.6 | 130.9 | — | 112-153.1 | |
| 80/20 | — | 180.9 | 149.2 | — | — | — | — | — | — |
| 100/0 | 247 | 186.6 | 170.4 | 215 | 131 | 143.5 | 147.6 | 143 | 130.5 |

EXAMPLE 11

Using the N-phenyl polyglutarimides of examples 2, 3, 6 and 8 and according to the modalities illustrated in example 10, mixtures with ABS copolymer in different weight ratios were prepared.

The used ABS copolymer consisted of:

| | |
|---|---|
| polybutadiene | 14% by weight |
| SAN copolymer (at 24% by weight of acrylonitrile) | 86% by weight |

It exhibited the following characteristics:
[$\eta$] in THF at 30° C. = 0.57 dl/g
Tg = 107.6° C.

The Tg values determined on the mixtures so obtained are reported in Table II.

TABLE II

| IMIDE/AES | EXAMPLES | | | |
|---|---|---|---|---|
| | 2 Tg °C. | 3 Tg °C. | 6 Tg °C. | 8 Tg °C. |
| 0/100 | 107.6 | 107.6 | 107.6 | 107.6 |
| 20/80 | — | 122.8 | — | — |
| 40/60 | 131.3 | 130.9 | 120.2 | 110.145 |
| 60/40 | 152.2 | 146.2 | 128.9 | — |
| 80/20 | — | 156.3 | — | — |
| 100/0 | 186.6 | 170.4 | 143.5 | 143 |

EXAMPLE 12

Using the N-phenyl polyglutarimides of examples 3, 4, 6 and 8 and following the modalities described in example 10, mixtures with SAN copolymers in different weight ratios were prepared.

The SAN copolymer had an acrylonitrile content equal to 24% by weight. Its characteristics were as follows:
[$\eta$] in THF at 30° C. = 0.8 dl/g
Tg = 109.2° C.

The Tg values exhibited by the mixtures so obtained are reported in Table III.

TABLE III

| IMIDE/AES | EXAMPLES | | | |
|---|---|---|---|---|
| | 3 Tg °C. | 4 Tg °C. | 6 Tg °C. | 8 Tg °C. |
| 0/100 | 109.2 | 109.2 | 109.2 | 109.2 |
| 20/80 | 116.1 | — | — | — |
| 40/60 | 125.3 | 141.1 | 122.5 | 110.148 |
| 60/40 | 138.1 | 156.9 | 129.5 | — |
| 80/20 | 151.8 | — | — | — |
| 100/0 | 170.4 | 215 | 143.5 | — |

EXAMPLE 13

Using the N-phenyl polyglutarimides of example 4 and following the modalities of example 10 mixtures with SAN copolymers having an acrylonitrile content equal to 31% and 40% by weight, respectively, were prepared.

Such copolymers exhibited a specific viscosity in dichloroethane at 25° C., at a concentration of 1 g/l, equal to 0.065 and 0.08, respectively.

The Tg values exhibited by the mixtures so obtained are reported in Table IV.

TABLE IV

| % ACRYLONITRILE IN SAN | EXAMPLES | | | |
|---|---|---|---|---|
| | 0/100 Tg °C. | 40/60 Tg °C. | 60/40 Tg °C. | 100/0 Tg °C. |
| 31% | 108.5 | 136.4 | 160.1 | 215 |
| 40% | 111.8 | 133.1 | 162.5 | 215 |

We claim:
1. Compositions comprising:
   a) from 1 to 99% by weight of a styrene copolymer selected from the group consisting of copolymers consisting of acrylonitrile/butadiene/styrene; acrylonitrile/styrene/ethylenepropylene; and styrene/acrylonitrile;
   b) from 99 to 1% by weight of a N-aryl polyglutarimide having a Tg of at least 130° C. prepared by an imidization reaction of an acrylic polymer with a compound having the formula:

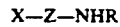

wherein:
   R = an aryl radical

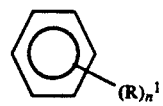

where $R^1$ is a halogen atom, a hydroxyl, carboxylic, or alkyl group containing from 1 to 4 carbon atoms;
   n = an integer from 0 to 3;

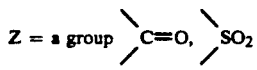

or $-C_6H_4-SO_2-$;
   X = hydrogen, an alkyl, cycloalkyl, aryl, aralkyl or alkylaryl radical containing from 1 to 20 carbon atoms, and optionally containing halogen atoms as substituents, and furthermore, when

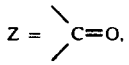

X is also a —NHR group or a —Y—CONHR group;

Y = an alkylene radical containing from 1 to 12 carbon atoms, is straight or branched.

2. The compositions according to claim 1, wherein the N-aryl polyglutarimide is a N-phenyl polyglutarimide.

3. The compositions according to claim 1 wherein the N-aryl polyglutarimide exhibits an imidic nitrogen content ranging from 0.50 to 6.1% by weight.

4. The compositions according to claim 1, wherein the N-aryl polyglutarimide exhibits Tg values of at least 140° C.

5. The compositions according to claim 4, wherein the N-aryl polyglutarimide exhibits a Tg value of at least 170° C.

6. The compositions according to claim 1 wherein the N-aryl polyglutarimide has been prepared by using an imidization agent selected from the group consisting of N,N'-phenylurea, N-phenylformamide and N-phenylacetamide.

* * * * *